Patented Jan. 29, 1946

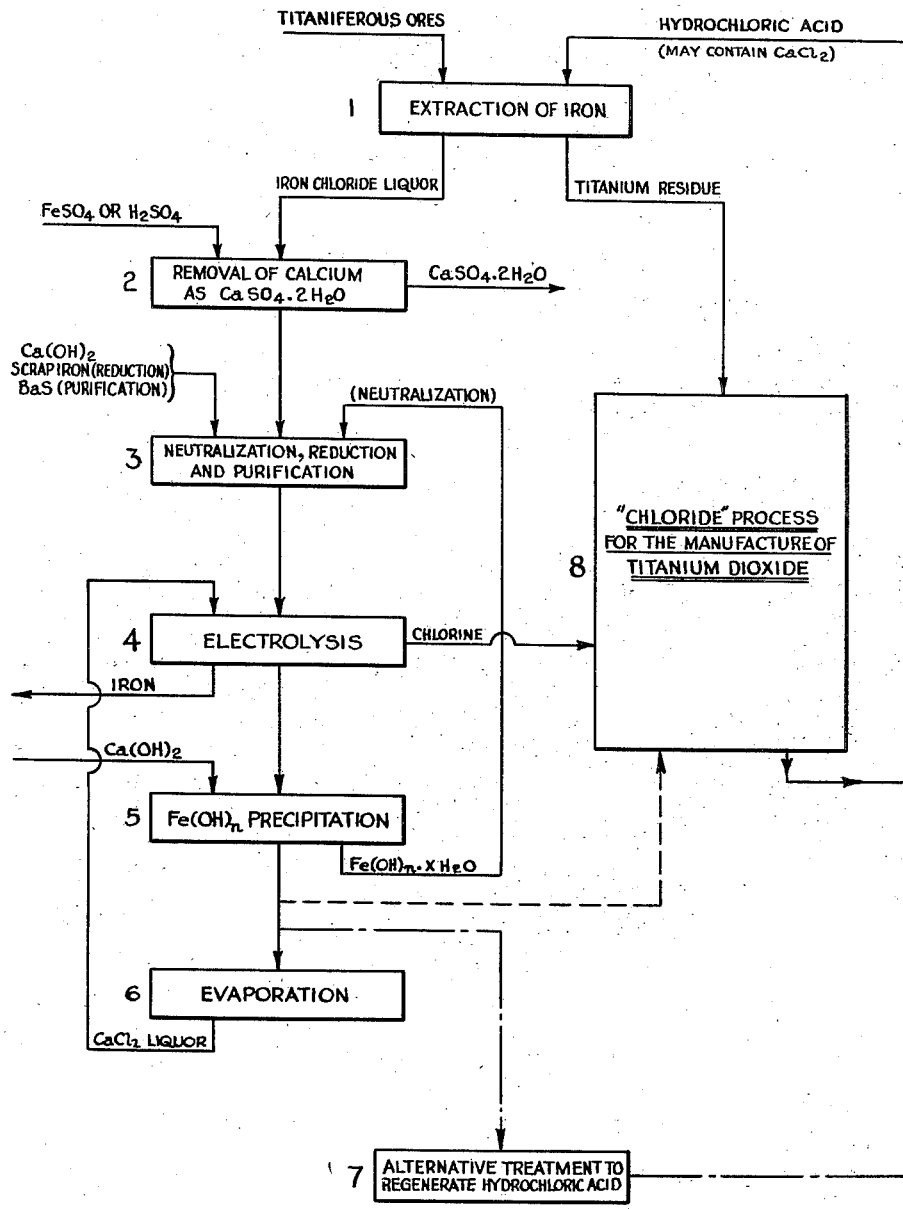

2,393,582

UNITED STATES PATENT OFFICE 2,393,582

METHOD FOR UTILIZING IRON CHLORIDE LIQUORS

William Y. Agnew, Little Silver, N. J., assignor to National Lead Company, New York, N. Y., a corporation of New Jersey Application August 8, 1942, Serial No. 454,194

7 Claims. (Cl. 204—113)

The present invention relates to the industrial utilization of iron chloride liquors. It is especially adapted for the treatment of iron chloride liquors as are obtained, for instance, from the well-known "pickling" processes practiced in the iron and steel industry and from the so-called "chloride" processes for the manufacture of titanium dioxide pigments in which iron is extracted from titaniferous ores by means of hydrochloric acid.

According to the present invention the major portions of the iron and chlorine contained in the iron chloride liquor are recovered by electrolysis in a suitable cell. The iron chloride liquor may be introduced into the cell as catholyte and calcium chloride introduced as anolyte or, if desired, the iron chloride may contain calcium chloride. Due to economic considerations all of the iron cannot be deposited and the cell effluent still contains considerable quantities of iron chlorides as well as calcium chloride which render the effluent unsuitable for further use as anolyte and, since the effluent contains only a slight percentage of free acid, it is also unsuitable for further extraction of iron. By means of the present invention this cell effluent may be processed so that the iron content may be re-used as catholyte and the calcium chloride as anolyte in a subsequent electrolysis or for the regeneration of hydrochloric acid suitable for additional extraction of iron.

Among the principal objects of the invention are: (a) an economical method for recovering the iron and chlorine values from iron chloride liquors; (b) a method for regenerating and reusing the effluent resulting from the electrolysis of an iron chloride liquor; (c) a cyclical process wherein iron chloride liquors are electrolyzed, hydrochloric acid is regenerated from the effluent and used for further extraction of iron and the resultant iron chloride again electrolyzed; (d) means for preventing the accumulation, or buildup, in the circulating liquor of substances which may be used in the treatment of the liquor. These and other objects of the invention will be appreciated from this description.

The present invention embraces certain essential steps including (1) the electrolysis; (2) the precipitation of iron from the effluent and its possible re-use to neutralize free hydrochloric acid in fresh iron chloride liquor; (3) concentration of the iron-free calcium chloride effluent and its return to a subsequent electrolysis. With these essential steps may be associated certain other treatments of the iron chloride liquors as may be necessary in view of the origin of the liquor in order to render it suitable for electrolysis. For instance, when the iron chloride liquor is derived from a "chloride" process for the manufacture of titanium dioxide pigments it may contain, in addition to iron chlorides, free hydrochloric acid, some calcium chloride as well as other impurities extracted along with the iron from the titaniferous ore. When handling such liquors according to the present invention the auxiliary, or prior, treatments of the iron chloride liquor may include the removal of the calcium and other impurities, the neutralization of free hydrochloric acid, elimination of sulfate, if any is present, reduction of ferric iron to ferrous condition, etc., all as will subsequently be explained. Furthermore, the invention contemplates the regeneration of hydrochloric acid from a portion of the calcium chloride effluent obtained after electrolysis and removal of iron.

The invention will now be described with reference to its adaptation to treatment of iron chloride liquor obtained from a "chloride" process for the manufacture of titanium dioxide, reference being made to the flow-sheet, Fig. 1. It will be understood, however, that the invention is not limited to its employment in connection with any particular process which yields iron chloride liquor. Thus, it is equally well adapted for use with iron chloride liquor derived from "pickling" processes as from titanium dioxide manufacture. Regardless of the source of the iron chloride liquor the essential steps of the invention, as specified above, are the same although the auxiliary treatments of the iron chloride liquor may be varied as necessary in view of the composition of the iron chloride. The illustration of the invention in connection with the manufacture of titanium dioxide has been selected, first, because of the growing interest in "chloride" processes for producing titanium dioxide and, second, because it includes a representative number of auxiliary treatments of the iron chloride liquor and alternative treatments of the iron-free calcium chloride effluent.

The reference numeral 1, of Fig. 1, represents the extraction of iron from titaniferous ore, e. g., ilmenite, with hydrochloric acid. This extraction may be carried out in any convenient manner known to the art. From this extraction there is obtained the crude iron chloride liquor and a titanium-bearing residue. As shown in Fig. 1, the extraction may be carried out with hydrochloric acid derived from a "chloride" process for the manufacture of titanium dioxide, for instance, as the mother liquor from the hydrolysis of a titanium chloride solution. If, as shown in Fig. 1, the calcium chloride effluent is introduced into the "chloride" process, for instance, prior to hydrolysis, calcium chloride will be found in the hydrolysis mother liquor used for the extraction of iron in step 1 and will carry through into the iron chloride liquor. Step 1, in reality, represents any possible source of iron chloride. For purpose of explaining the invention it would be equally illustrative to represent step 1 as a "pickling" process as practiced in the iron and steel industry.

The reference numeral 2, of Fig. 1, illustrates the removal of calcium from the iron chloride liquor. For this purpose a sulfate of any metal which will not exert an undesirable effect on the subsequent phases of the process may be used but it is preferable to use either copperas, $FeSO_4.7H_2O$, a cheap industrial by-product, or sulfuric acid. The purpose of the removal of the calcium is chiefly to prevent "build-up" of this substance during the cyclical operation of the invention. If, however, as shown in step 7, the unevaporated portion of the calcium chloride effluent is treated to regenerate hydrochloric acid which may be used in the extraction of additional iron the resulting iron chloride liquor will then contain no calcium chloride and hence this step may be omitted.

The iron chloride liquor after the treatment shown in step 2 will be composed, generally, of iron as ferric and ferrous chlorides, free hydrochloric acid, some dissolved calcium sulfate and impurities extracted from the source of iron. It is now ready for neutralization, reduction and purification as shown at 3 of Fig. 1.

The neutralization is effected primarily by adding to the iron chloride liquor the iron hydroxides precipitated from the electrolysis effluent in step 5, shown on Fig. 1. This addition of iron hydroxide, which in itself will consist of both ferric and ferrous iron will increase the amount of ferric iron present in the iron chloride liquor. In those cases where an insufficient amount of precipitated iron hydroxide is available for complete neutralization of the free hydrochloric acid contained in the iron chloride liquor, the neutralization may be completed during the reduction step. If additional neutralization is required any suitable acid-binding agent, e. g. an alkali metal oxide, hydroxide or carbonate may be added, but the use of an alkaline reacting calcium compound, e. g. the oxide, hydroxide or carbonate is to be recommended because such compounds assist in the elimination of impurities. The reduction step which converts the ferric iron to ferrous iron is preferably effected by adding scrap iron to the liquor in a sufficient amount to convert all the ferric to ferrous and to leave a small excess which is removed in the subsequent purification.

The removal of metal impurities such as manganese, zinc, etc., which particularly if ilmenite was used as the source of iron, may be present in the iron chloride liquor, may be effected by means of the addition of barium sulfide or other compound capable of precipitating such impurities. The sulfate which is present in the iron chloride liquor as dissolved calcium sulfate is also removed thereby. These treatments will precipitate the impurities which together with any excess scrap iron are removed by filtration or otherwise. The alkaline reagents, i. e., the calcium and barium compounds should not be added in amounts greater than will precipitate about 5 per cent of the iron present in the solution.

It will be understood that when dealing with iron chloride liquors of different compositions it may not be necessary to employ all of the treatments herein described. For instance, if an iron chloride liquor which contains no free hydrochloric acid is to be electrolyzed, then it will not be necessary to neutralize it, although if ferric iron is present, a reducing treatment will be employed. It will be appreciated that within the scope of the invention the treatments of the iron chloride liquor will be employed as required by the composition of the iron chloride liquor.

The reference numeral 4, of Fig. 1, represents the electrolysis of the iron chloride solution. Before beginning the electrolysis it is desirable to add to the solution a small amount of free hydrochloric acid, say from about 0.1 to about 5.0 per cent, preferably about 1 per cent. This acid concentration, it has been found, gives the best results upon electrolysis. For the electrolysis an electrolytic cell divided into an anode portion and a cathode portion by a permeable diaphragm should be used. The cell should preferably be provided with a carbon anode and an iron cathode. The electrolysis may conveniently be carried out at a current density of from about 4 to about 20 amperes per square decimeter. During the electrolysis the calcium chloride obtained by evaporation of the iron-free electrolysis effluent is introduced into the cell as anolyte, iron chloride constituting the catholyte. For an efficient electrolysis the anolyte solution should have a calcium chloride content of from 100 grams to about 400 grams calcium chloride, $CaCl_2$, per liter, while the catholyte at the beginning of the electrolysis should have a ferrous iron content of from about 100 grams to about 200 grams per liter. It has been found that good results are obtained when the combined content of iron as $Fe^{++}$ and calcium chloride does not fall substantially below 150 grams per liter. If desired the electrolysis may be carried on in such manner that the iron chloride liquor contains calcium chloride.

Because, as the solution is denuded of iron, the current efficiency rapidly decreases and the quality of the iron being deposited deteriorates, the electrolysis should preferably be carried out depending upon current densities, concentration of solution and the like until from about 50 per cent to about 80 per cent of the iron in solution is deposited out. The electrolysis effluent will accordingly contain considerable values of iron, calcium and chlorine. These will be recovered in the subsequent steps of the invention. There is recovered by means of this electrolysis a valuable electrolytic iron which is deposited at the cathode and chlorine gas which is liberated at the anode. The chlorine gas may be utilized in any process requiring it or it may be sold as such. As shown in Fig. 1, it is introduced into a "chloride" process for the manufacture of titanium dioxide.

The reference numeral 5, of Fig. 1, represents the removal of iron from the electrolysis effluent. This removal is accomplished by adding to the effluent sufficient amount of an alkaline reacting calcium compound, e. g., the oxide, hydroxide or carbonate to precipitate the iron as hydroxide, both ferric and ferrous. The iron hydroxides thus precipitated are separated in any convenient manner from the mother liquor which will then consist essentially of a solution of calcium chloride and are used in a subsequent neutralization step, shown at 3 of Fig. 1.

The iron-free electrolysis effluent will now be divided into two portions; the first should contain an amount of calcium chloride equal to that which is to be added as anolyte to a subsequent electrolysis. This portion will be concentrated, as by evaporation, to a calcium chloride content per unit volume suitable to be added to the electrolysis cell as anolyte, according to the description given above. That is to say, this concentrated portion of the iron-free effluent will be concentrated to a calcium chloride content of from about 300 grams per liter to about 400 grams per liter.

The remaining portion of the effluent may be treated in different ways. As shown by the dotted line at Fig. 1, it may be introduced into a "chloride" process for the manufacture of titanium dioxide in which case the calcium chloride will be carried through the process and will be found in the hydrochloric acid hydrolysis mother liquor which is used for extracting additional amounts of titaniferous ore. Alternatively, as represented by the reference numeral 7 of Fig. 1, this second portion of the iron-free effluent may be treated to regenerate hydrochloric acid which may be used for the production of additional quantities of iron chloride. Such regeneration treatment will preferably be in the nature of that represented on Fig. 1 by the step designated by the reference numeral 2. In such treatment this portion of the effluent will preferably be treated with sulfuric acid or iron sulfate whereby the calcium is precipitated as calcium sulfate leaving a solution of hydrochloric acid or iron chloride.

The following example will illustrate the practices of the invention as depicted in Fig. 1, adapted to employment with a "chloride" process for the manufacture of titanium dioxide. In this example it is assumed that the cyclical process has been in operation and the description of the example begins with the treatment of the electrolysis effluent.

Example

The effluent from the electrolysis consists of about 2,400 gallons of liquor containing about 600 pounds of iron as iron chlorides (the ratio of ferrous to ferric chloride will vary somewhat depending upon operating conditions) and about 1,400 pounds of calcium chloride. The iron is precipitated from the solution by adding thereto about 900 pounds of slaked lime, $Ca(OH)_2$. The precipitated iron hydrates are filtered off and washed with about 1,000 pounds of water yielding about 2,500 gallons of filtrate and about 1,600 pounds of filter cake. The filtrate from the above operation is then split into two portions each of about 1,250 gallons. The first portion is concentrated by evaporating about 650 gallons of water, leaving about 600 gallons of a solution containing about 1,350 pounds of calcium chloride. The other portion of the filtrate in the example was introduced into a "chloride" process for the manufacture of titanium dioxide, in which process it was used to dissolve titanium tetrachloride in the preparation of the hydrolysis solution. After the hydrolysis of the resultant titanium tetrachloride solution a hydrochloric acid mother liquor containing then approximating 1,300 pounds of calcium chloride was obtained. This hydrolysis mother liquor amounted to about 1,800 gallons and contained about 3,440 pounds of free hydrochloric acid. This 1,800 gallons of hydrochloric acid hydrolysis mother liquor containing the 1,300 pounds of calcium chloride was then employed to extract the iron from about 4,660 pounds of ilmenite ore. This extraction yielded about 1,750 gallons of crude iron chloride solution containing about 1,575 pounds of iron as iron chlorides, ferric and ferrous being present at about the same ratio as contained in the ilmenite, 1,300 pounds of calcium chloride, and about 1,800 pounds of free hydrochloric acid.

To this crude iron chloride solution was added about 3,250 pounds of copperas, $FeSO_4.7H_2O$, (1,150 pounds of sulfuric acid calculated as 100 per cent $H_2SO_4$ could also be used) in order to precipitate the calcium as calcium sulfate. The precipitated calcium sulfate was filtered off, washed, and calcined to yield a valuable anhydrous calcium sulfate. The iron chloride solution at this stage has a volume of about 1,800 gallons and contained about 2,250 pounds of iron chlorides (the solution having been enriched by the copperas), 100 pounds of dissolved calcium sulfate, and 800 pounds of free hydrochloric acid.

The 1,600 pounds of iron hydrate filter cake obtained as above described was now added to the iron chloride liquor together with 500 pounds of scrap iron, in order to neutralize the free hydrochloric acid and to reduce ferric iron to ferrous condition. Approximately 200 pounds of the scrap iron were dissolved during the reduction. Thus, as a result of the addition of the iron hydrates and the dissolved scrap iron, the iron content of the liquor was increased to about 3,000 pounds. About 100 pounds of a 50 per cent slurry of slaked lime, $Ca(OH)_2$, were now added in order completely to neutralize the solution together with about 125 pounds of barium sulfide in order to precipitate sulfates and other impurities carried over with the iron from the ilmenite. The precipitated impurities were then filtered off, yielding a solution containing about 2,900 pounds of iron, as ferrous chloride.

Before introducing the iron chloride liquor which now had a volume of about 1,800 gallons into the electrolysis cells about 100 pounds of technical hydrochloric acid was added. Thereafter, the iron chloride liquor was introduced as catholyte into the electrolytic cells while the 600 gallons of concentrated calcium chloride liquor obtained as above described and containing about 1,350 pounds of calcium chloride was introduced as catholyte. The electrolysis was carried out using a voltage of about 3.5 volts and an amperage of about 500 amperes until about 2,300 pounds of iron were deposited and about 2,900 pounds of chlorine gas were liberated. The chlorine gas was dried and introduced into a "chloride" process for the manufacture of titanium dioxide. The cell effluent after electrolysis consisted of about 2,400 gallons of a solution containing about 600 pounds of iron as ferric and ferrous chlorides and about 1,400 pounds of calcium chloride. It was then treated with about 900 pounds of calcium hydroxide, $Ca(OH)_2$ as described at the beginning of this example and the cyclical process maintained.

It will be seen that there is provided by the present invention a simple and efficient cyclical process for the utilization of industrial iron chloride liquors whereby a valuable electrolytic iron and chlorine gas are obtained, all without loss of iron or chlorine values.

I claim:

1. Process for the electrolysis of ferrous chloride liquor containing free hydrochloric acid which comprises adding sufficient iron hydrate to such liquor substantially to neutralize the free hydrochloric acid contained therein, electrolyzing the neutralized ferrous chloride liquor wherein the ferrous chloride constitutes substantially the catholyte and a calcium chloride solution the anolyte to deposit at the cathode as electrolytic iron a major portion of the dissolved iron while liberating chlorine gas at the anode, adding a sufficient amount of a compound selected from the group consisting of the oxides, hydroxides and carbonates of calcium to the electrolysis effluent to precipitate as iron hydrates the unelectrolyzed iron contained therein, employing said hydrates for the neutralization of the free hydrochloric acid content of additional ferrous chloride liquor to be used as catholyte in subsequent electrolysis, concentrating a portion of the substantially iron-free calcium chloride effluent containing an amount of calcium chloride substantially equal to that contained in the original electrolysis liquor and returning this concentrated portion to a subsequent electrolysis for use as anolyte.

2. Process for electrolysis of iron chloride liquor containing ferrous iron, ferric iron and hydrochloric acid which comprises adding to such an iron chloride liquor sufficient iron metal to reduce the ferric iron to ferrous condition and thereafter sufficient iron hydrates to neutralize the free hydrochloric acid, then electrolyzing the resulting ferrous chloride liquor wherein the ferrous chloride constitutes substantially the catholyte and a calcium chloride solution the anolyte to deposit at the cathode as electrolytic iron a major portion of the dissolved iron while liberating chlorine gas at the anode, adding a sufficient amount of a compound selected from the group consisting of the oxides, hydroxides and carbonates of calcium to the electrolysis effluent to precipitate the unelectrolyzed iron contained therein as iron hydrates, employing the said hydrates for the neutralization of the free hydrochloric acid content of additional ferrous chloride liquor to be used as catholyte in subsequent electrolysis, concentrating a portion of the substantially iron-free calcium chloride effluent containing an amount of calcium chloride substantially equal to that contained in the original electrolysis liquor and returning this concentrated portion to a subsequent electrolysis for use as anolyte.

3. Process according to claim 1 wherein the neutralization is carried out in such manner that after addition of all of the iron hydrate there will remain in the ferrous chloride liquor a small amount of free hydrochloric acid.

4. Process according to claim 2 wherein the reduction and neutralization are carried out in such manner that after addition of the iron metal and iron hydrate there will remain in the ferrous chloride liquor a small amount of free hydrochloric acid.

5. Process according to claim 1 wherein the unconcentrated portion of the substantially iron-free calcium chloride electrolysis effluent is treated with sufficient sulfuric acid to precipitate substantially completely the calcium as calcium sulfate leaving a solution consisting essentially of hydrochloric acid.

6. Process according to claim 1 wherein prior to neutralization any cations the sulfates of which are insoluble contained in the iron chloride liquor are eliminated by treating the iron chloride liquor with a compound selected from the group consisting of iron sulfates and sulfuric acid.

7. Process for the electrolysis of ferrous chloride liquor containing calcium chloride and free hydrochloric acid which comprises adding sufficient iron hydrate to such liquor substantially to neutralize the free hydrochloric acid contained therein, electrolyzing the neutralized ferrous chloride liquor containing calcium chloride to deposit at the cathode as electrolytic iron a major portion of the dissolved iron while liberating chlorine gas at the anode, adding a sufficient amount of a compound selected from the group consisting of the oxides, hydroxides, and carbonates of calcium to the effluent to precipitate as iron hydrates the unelectrolyzed iron contained therein, employing said hydrates for the neutralization of the free hydrochloric acid content of additional ferrous chloride liquor to be used in a subsequent electrolysis, concentrating a portion of the substantially iron-free calcium chloride effluent containing an amount of calcium chloride substantially equal to that contained in the original electrolysis liquor and returning this concentrated portion admixed with additional ferrous chloride solution to a subsequent electrolysis.

WILLIAM Y. AGNEW.